(12) United States Patent
Schoeneck

(10) Patent No.: US 12,054,125 B2
(45) Date of Patent: Aug. 6, 2024

(54) WIPER MOTOR AND METHOD FOR THE PRODUCTION THEREOF

(71) Applicant: Valeo Systemes d'Essuyage, La Verriere (FR)

(72) Inventor: Harald Schoeneck, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 382 days.

(21) Appl. No.: 17/621,170

(22) PCT Filed: Jun. 29, 2020

(86) PCT No.: PCT/EP2020/068203
§ 371 (c)(1),
(2) Date: Dec. 20, 2021

(87) PCT Pub. No.: WO2021/001299
PCT Pub. Date: Jan. 7, 2021

(65) Prior Publication Data
US 2022/0363222 A1 Nov. 17, 2022

(30) Foreign Application Priority Data
Jul. 2, 2019 (DE) .......................... 102019117843.6

(51) Int. Cl.
*B60S 1/08* (2006.01)
*H02K 7/116* (2006.01)
(52) U.S. Cl.
CPC .............. *B60S 1/08* (2013.01); *H02K 7/1166* (2013.01)
(58) Field of Classification Search
CPC ................................ B60S 1/08; H02K 7/1166

USPC .......................................................... 310/219
See application file for complete search history.

(56) References Cited

U.S. PATENT DOCUMENTS

| | | | | |
|---|---|---|---|---|
| 4,614,886 A | * | 9/1986 | Schneider | H02K 5/225 310/239 |
| 4,625,359 A | * | 12/1986 | Egner-Walter | B60S 1/365 15/250.21 |
| 5,140,207 A | * | 8/1992 | Baumeister | H02K 5/225 310/71 |
| 2006/0033390 A1 | * | 2/2006 | Guettinger | H02K 5/145 310/89 |

(Continued)

FOREIGN PATENT DOCUMENTS

DE 102011051090 A1 12/2012
FR 2981030 A1 4/2013

OTHER PUBLICATIONS

European Patent Office, International Search Report and Written Opinion of corresponding application No. PCT/EP2020/068203, dated Sep. 22, 2020.

*Primary Examiner* — Rashad H Johnson
(74) *Attorney, Agent, or Firm* — Valeo Systemes d'Essuyage

(57) ABSTRACT

The invention relates to a wiper motor having a housing element connected to an electrical line that has an elastically deformable spring element in an end region projecting out of the housing element, wherein the spring element, in order to form an electrically conductive connection with a counterpart element on the housing element, is movable, with respect to a first, relaxed position of the spring element, into a second, elastically deformed position generating a contact force on the counterpart element.

13 Claims, 2 Drawing Sheets

(56) References Cited

U.S. PATENT DOCUMENTS

| | | | |
|---|---|---|---|
| 2012/0000303 A1* | 1/2012 | Stefani | B60S 1/166 |
| | | | 74/89.14 |
| 2012/0187785 A1* | 7/2012 | Stefani | H02K 11/33 |
| | | | 310/71 |
| 2013/0247323 A1* | 9/2013 | Geubel | B60S 1/3493 |
| | | | 15/250.31 |
| 2015/0084459 A1* | 3/2015 | Schmid | H02K 5/22 |
| | | | 310/71 |
| 2015/0135465 A1* | 5/2015 | Depondt | B60S 1/4087 |
| | | | 15/250.32 |
| 2017/0159793 A1* | 6/2017 | Schorpp | H02K 7/081 |
| 2017/0253217 A1 | 9/2017 | Servin et al. | |
| 2018/0166944 A1* | 6/2018 | Stefani | B60S 1/3493 |
| 2020/0099186 A1* | 3/2020 | Stefani | H01R 39/381 |
| 2023/0179035 A1* | 6/2023 | Lange | H02K 7/116 |
| | | | 310/83 |

* cited by examiner

WIPER MOTOR AND METHOD FOR THE PRODUCTION THEREOF

CROSS-REFERENCE TO RELATED APPLICATIONS

This application is filed under 35 U.S.C. § 371 U.S. National Phase of International Application No. PCT/EP2020/068203 filed Jun. 29, 2020 (published as WO2021001299), which claims priority benefit to German application No. 102019117843.6 filed on Jul. 2, 2019, the disclosures of which are herein incorporated by reference in their entirety.

TECHNICAL FIELD

The invention relates to a wiper motor having the features in the preamble of claim 1, as is used for cleaning a vehicle window by means of at least one wiper blade. Furthermore, the invention relates to a method for producing a wiper motor according to the invention.

BACKGROUND OF THE INVENTION

A wiper motor having the features in the preamble of claim 1 is known from the Applicant's DE 10 2011 051 090 A1. The known wiper motor is distinguished by a gearwheel driven by an electric motor, the rotation-angle position of said gearwheel, for at least indirectly sensing the position of a wiper arm driven by the wiper motor, having an electrically conductive element in the form of a flat element consisting of metal, which, when passing over, is detectable by means of a contact portion of a sensing finger that is configured in the form of a spring element on the side facing the element. In that case, the element acts in the manner of an electric switch. The gearwheel and the sensing finger are arranged in the region of a gearbox housing of the wiper motor, wherein the spring element and the sensing finger are usually located in a gearbox cover of the gearbox housing. During the assembly of the gearbox housing and the wiper motor, the gearbox cover is joined to the rest of the gearbox housing, wherein the spring element, initially arranged in the gearbox cover without spring preload, i.e. in a relaxed state, is pushed against the electrically conductive element or a running surface of the gearwheel, with a contact force or spring preload being developed.

In the series production of such wiper motors, the gearbox covers with spring elements arranged therein are stored and transported in transport containers, it being necessary to ensure that the spring elements are arranged in a protected manner during transport and within the transport containers, in order to avoid mechanical damage to or deformation of the spring elements, which would otherwise result in erroneous abutment of the spring element against the gearwheel during assembly. This requires for example appropriate receptacles in the transport containers and generally careful and cautious handling.

BRIEF SUMMARY OF THE INVENTION

The wiper motor according to the invention having the features of claim 1 has the advantage that the housing element with the spring element arranged thereon is mechanically more robust, making it possible for example, in particular during transport and handling, to store the housing element more easily in the transport containers, that is to say without additional receptacles, or similar elements, protecting the spring elements. Such handling or such transport reduces costs, wherein, at the same time, damage to and deformation of the spring element are avoided sufficiently reliably by a protected arrangement of the spring element, and so the functionality of the wiper motor after assembly is ensured.

According to the invention, in this regard, the teaching of claim 1 proposes that a blocking element be provided on the housing element or on the gearbox cover, which holds the spring element in an elastically deformed position in which the deformation of the spring element is less than in the working position of the spring element with the wiper motor assembled.

The partially deformed (intermediate) position of the spring element before it is assembled on the gearbox housing results in a smaller overall height of the gearbox cover and thus not only results in a more compact arrangement in a transport container, but also the probability of contact with other components or gearbox covers, and thus a potential deformation risk or damage to the spring element, is reduced.

Advantageous developments of the wiper motor according to the invention are presented in the dependent claims.

In particular, as a result of the blocking element, a contact portion of the spring element in the first, relaxed position is at a distance from a cover bottom of the gearbox cover that is greater than a distance of the contact portion of the spring element in the third position, in which the blocking element acts on the spring element, and a distance of the contact portion of the spring element in the second position (with the wiper motor assembled) from the cover bottom is less than the distance in the third position of the contact portion of the spring element. Such an arrangement has the effect that a reduced distance and, as seen overall, a gearbox cover having a lower height in the region of the spring element before assembly is achieved It is very particularly preferred when the spring element in the second and third positions is arranged regionally in a receptacle of the housing element. This means that, apart from the region of the spring element in the contact portion, the spring element is arranged within a receptacle or opening mechanically protecting the spring element. As a result, only the immediate contact portion of the spring element is arranged in a manner not protected from mechanical influences In a development of the last proposal, the receptacle has protective walls, which are arranged at a small distance from the spring element, and the protective walls are connected integrally to the housing element. Since such a housing element is usually in the form of an injection-molded plastics part in practice, the formation of such a receptacle, apart from a slightly smaller amount of material used, does not require increased manufacturing complexity. Rather, during manufacture or during the injection-molding of the housing cover, the receptacle is integrally formed on the housing cover.

In order to ensure the functionality or the abutting contact of the spring element with the corresponding counterpart surface of the gearwheel, provision is preferably made for a contact portion of the spring element to project beyond an end side of the protective walls in the three positions of the spring element.

As already mentioned above, provision is furthermore preferably made for the housing element to consist of plastic and to be in the form of an injection-molded part, and for the electrical line connected to the spring element to be encapsulated regionally with the material of the housing element.

In order to allow the blocking element to be assembled easily as far as possible without tools, provision is made for the blocking element to be connected to the housing element by means of a force- and/or form-fitting connection In a development of this proposal, the blocking element consists of a harder material than the housing element, in particular of steel, and the blocking element has barb-like elements that plastically deform the material of the housing element in the installed position of the blocking element in the housing element and as a result interlock with the material of the housing element Such a blocking element is formed preferably in a plate-like manner and is guided in a linearly movable manner in groove-like slots in the housing element In order to ensure the required nominal position of the blocking element in the housing element without complicated auxiliary devices, it is furthermore advantageous when the blocking element has at least one stop region for limiting the movement of the blocking element in the housing element in an insertion direction.

In a specific configuration of the invention, the housing element is in the form of a housing cover that closes a gearbox housing of the windscreen wiper motor, wherein the counterpart element cooperating with the spring element is arranged in the region of a gearwheel.

Furthermore, the invention also relates to a method for producing a wiper motor as described thus far, wherein the method has at least the following steps: First of all, the housing element or the gearbox cover with the electrical line (and spring element) fastened thereto is produced. Next, the blocking element is fastened to the housing element, wherein the spring element is moved from the first (unloaded) position into the third, partially preloaded position. Finally, the housing element is assembled on the wiper motor, wherein a counterpart element, cooperating with a contact portion of the spring element, on the housing element moves the spring element from the third position into the second.

Further advantages, features and details of the invention will become apparent from the following description of preferred exemplary embodiments of the invention and with reference to the drawings.

DETAILED DESCRIPTION OF THE INVENTION

Identical elements or elements having an identical function are provided with the same reference numbers in the figures.

Figure 1:
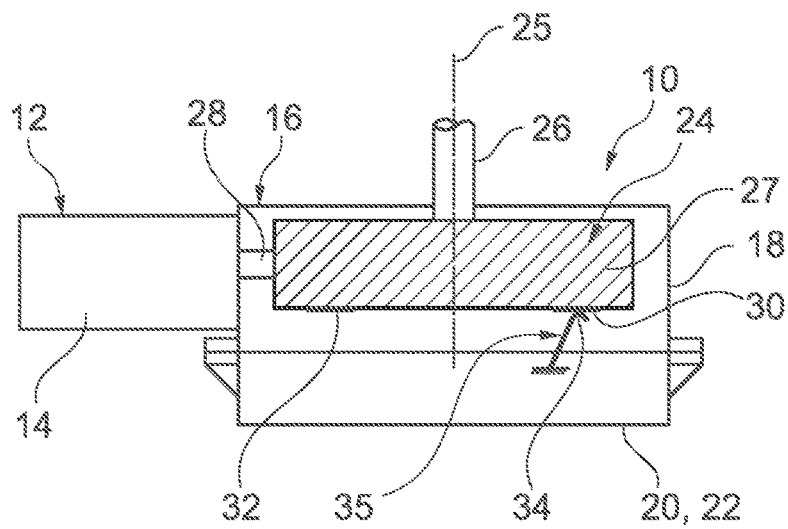
FIG. 1 shows a wiper motor in a simplified longitudinal section.

The wiper motor 10 illustrated in a highly simplified manner in FIG. 1 serves for at least indirectly driving a wiper arm or windscreen wiper (not illustrated). To this end, the wiper motor 10 has an electric motor 12, the housing 14 of which is flange-mounted on a gearbox housing 16. The gearbox housing 16 consists of at least two components, a pot-like first housing element 18, which is connected to a second housing element 20 in the form of a gearbox cover 22 via screw connections or via latching connections and closed off.

Within the gearbox housing 16, a gearwheel 24 is mounted in a rotatable manner on an axis of rotation 25, said gearwheel 24 being coupled in particular to an output shaft 26 that projects out of the gearbox housing 16 and serves to actuate the wiper arm or windscreen wiper.

The gearwheel 24 has on its outer circumference a toothing 27, which cooperates with a worm toothing (not shown) on an output shaft 28 of the electric motor 12. During operation of the wiper motor 10, or when the windscreen wiper is actuated, it is essential to detect the precise angular position of the wiper arm or windscreen wiper. This takes place via identification of the rotation-angle position of the gearwheel 24. To this end, the gearwheel 24 has at least one electrically conductive element, preferably in the form of a metal, flat element 30. The element 30 transitions, as seen in the circumferential direction about the axis of rotation 25, into a track 32 that consists of the plastic of the gearwheel 24 and is arranged concentrically with the axis of rotation 25.

Figure 2:
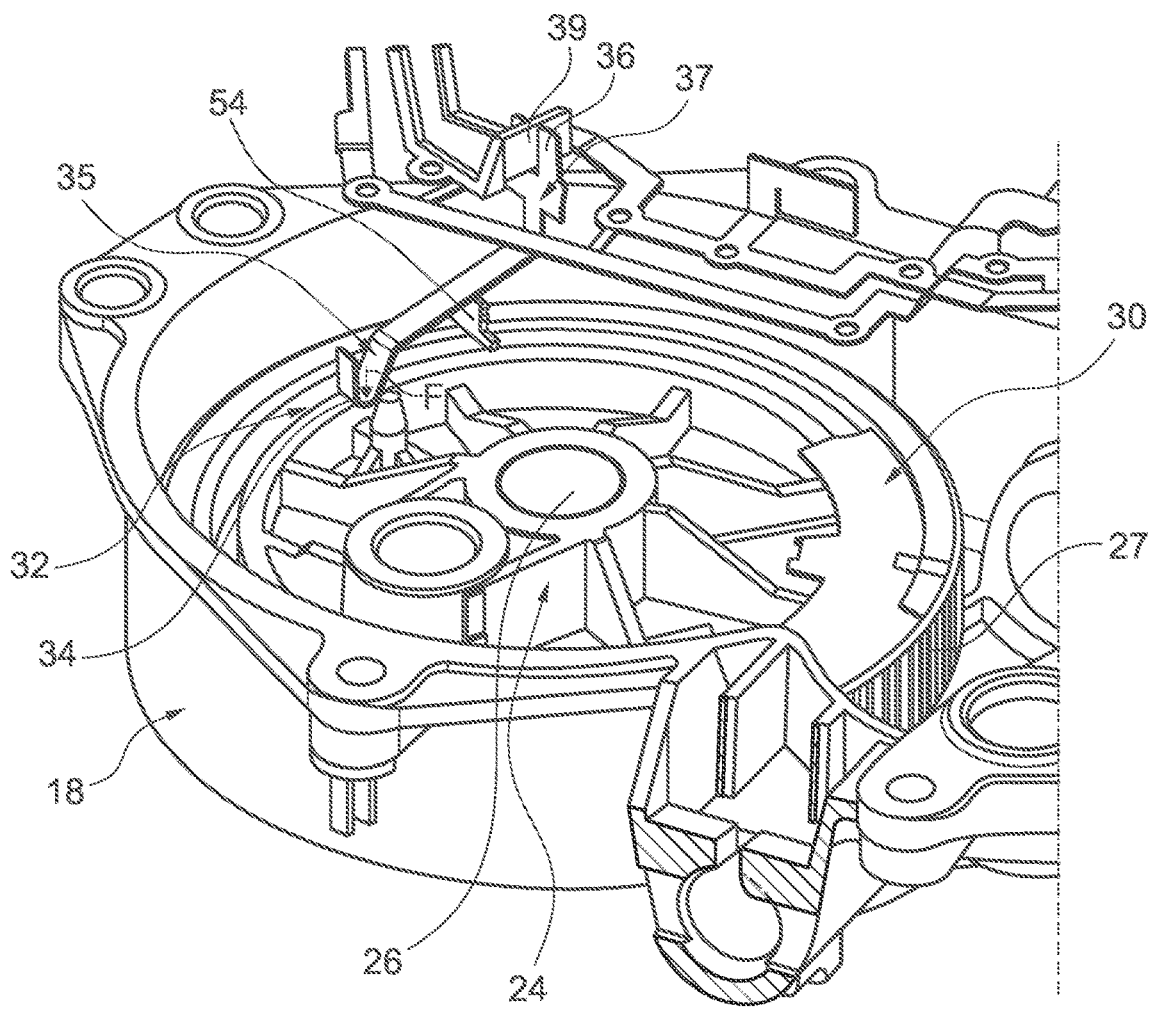
FIG. 2 shows a perspective illustration in partial section of a spring element, cooperating with a gearwheel, in a gearbox housing without a gearbox cover being illustrated.

With the gearbox housing 16 assembled, the track 32 or the element 30 is arranged as counterpart element in abutting contact with a contact portion 34 of a spring element 35. The spring element 35 is configured in particular in the form of a stamped/bent part and consists of a sheet-metal blank. On that side of the spring element 35 that faces away from the contact portion 34, the end portion 36 (discernible in FIG. 2) is arranged for example in electrically conductive contact with a socket-like receptacle in a further stamped/bent part 39, which, together with the spring element 35, forms an electrical line 37. The stamped/bent part 39 is brought into contact with the end portion 36 during the assembly of the wiper motor 10. The gearbox cover 22 is in the form of an injection-molded plastics part and regionally surrounds the spring element 35 by encapsulation, wherein the spring element 35 and the end portion 36 project out of the gearbox cover 22 and are free of the material of the gearbox cover 22.

Figure 3:
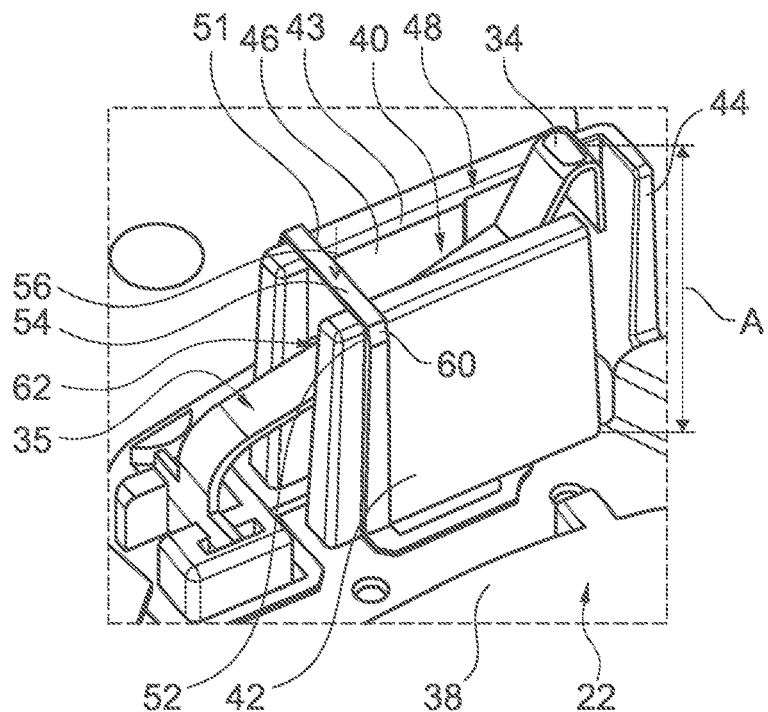
FIG. 3 shows a perspective illustration of a partial region of the gearbox cover with the spring element arranged in a protected manner in a receptacle of the gearbox cover.
Figure 4:
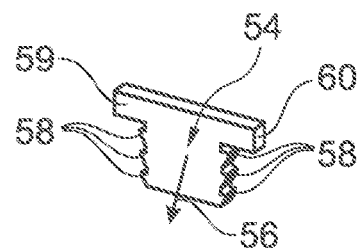
FIG. 4 shows a perspective illustration of a blocking element used in the arrangement according to FIG. 3.
Figure 5:
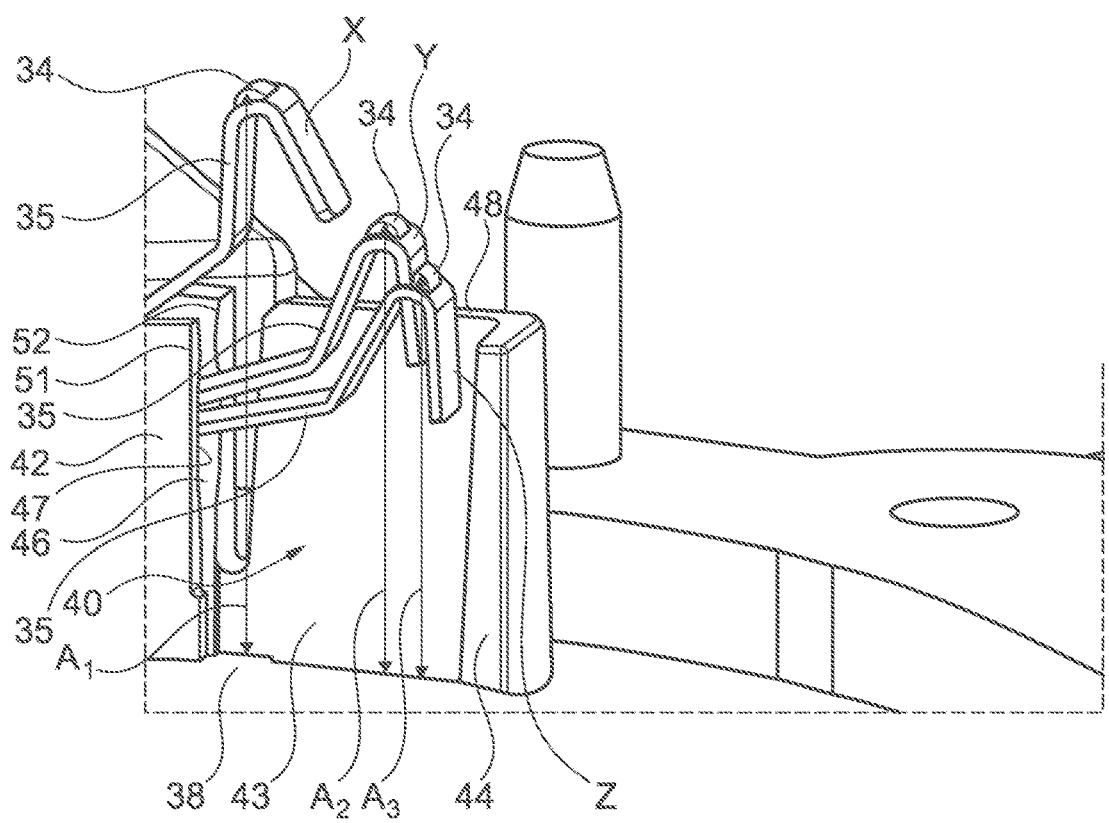
FIG. 5 shows a perspective illustration for exemplifying different positions of the spring element in the gearbox cover.

In accordance with the illustration in FIGS. 3 to 5, the spring element 35 projects with its contact portion 34 away from a cover bottom 38 of the gearbox cover 22, out of which it projects or is arranged at a distance A therefrom. It is essential here that at least a partial region of the portion of the spring element 35 that projects away from the cover bottom 38 is arranged in a protected manner. To this end, the gearbox cover 22, as is discernible in particular from the illustration in FIGS. 3 and 5, has a receptacle 40 for regionally receiving the spring element 35. The receptacle 40 is formed from protective walls 42 to 44, which project perpendicularly away from the cover bottom 38 and are integrally formed on the gearbox cover 22. In particular, the receptacle 40 is configured in a slot-like manner, such that the mutually facing inner faces 46, 47 of the protective walls 42, 43 are arranged at a small distance from the side faces of the spring element 35 that face them. Furthermore, the contact portion 34 of the spring element 35 projects beyond the end faces 48, facing away from the cover bottom 38, of the protective walls 42 to 44.

In the region of the protective walls 42, 43, the latter have two groove-like slots 51, 52 which are oriented towards one another and into which a blocking element 54 that consists of metal, in particular of steel, is insertable or introducible in a linear manner in an introduction direction 56. The blocking element 54, illustrated on its own in FIG. 4, has, on each side facing the inner faces 46, 47 of the protective walls 42, 43, for example three barb-like protrusions 58, which come into contact with the protective walls 42, 43 upon insertion of the blocking element 54 between the protective walls 42, 43, and lock together with the protective walls 42, 43 by plastic deformation of the material of the protective walls 42, 43, such that the blocking element 54 is held in a nominal position without further securing elements. This nominal position is defined by the depth of the slots 51, 52 in the protective walls 42, 43 in combination with portions 59, 60 of the blocking element 54 that project laterally away from the blocking element 54. When the blocking element 54 is introduced between the slots 51, 52, the portions 59, 60 come into abutting contact in the nominal position with the bottom of the slots 51, 52

FIG. 5 shows the spring element 35 in three positions X, Y and Z. In this case, the blocking element 54 is not illustrated in the receptacle 40 or the slots 51, 52 for reasons of simplification. The position X indicates a position of the spring element 35 in which the blocking element 54 is not assembled. In this state, the spring element 35 is relaxed, or without spring preload, and the contact portion 34 is thus at its greatest distance A1 from the cover bottom 38. In the position of the spring element 35 that is indicated by Y, the distance A2 of the contact portion 34 from the cover bottom 38 is less than the distance A1. The position Y of the spring element 35 indicates the position of the spring element 35 in which the blocking element 54 is located in its nominal position and in which the spring element 35 is partially preloaded. In this case, however, the gearbox cover 22 has not yet been connected to the first housing part 18 of the gearbox housing 16. In this state, the gearbox cover 22 is supplied for example to the assembly line for the wiper motor 10. During the assembly of the wiper motor 10, in particular during the connection of the gearbox cover 22 to the first housing part 18, the contact portion 34 of the spring element 35 comes into abutting contact with the element 30 or the track 32. As a result, the spring element 35 is pushed into the position Z, in which the distance A3 from the cover bottom 38 is even smaller than the distance A2. In the position Z, the spring preload of the spring element 35, in order to generate a contact force F (FIG. 2) on the track 32 and the element 30, is greater than in the position Y of the spring element 35. Furthermore, in the position Z of the spring element 35, a gap 62 (only indicated in FIG. 3) is formed between the spring element 35 and the facing side of the blocking element 54. In the position Z of the spring element 35, this position being necessary in order for it to be possible to operate the wiper motor 10 properly, the blocking element 54 has no function, wherein the spring element 35, as a result of the gap 62, can move freely to a certain extent, i.e. the distance A can change on account of the tolerance compensation between the components or on account of a different level of the element 30 and of the track 32.

The wiper motor 10 described thus far can be altered or modified in a wide variety of ways without departing from the concept of the invention.

REFERENCE SIGNS

10 Wiper motor
12 Electric motor
14 Housing
16 Gearbox housing
18 Housing element
20 Housing element
22 Gearbox cover
24 Gearwheel
25 Axis of rotation
26 Output shaft
27 Toothing
28 Output shaft
30 Element
32 Track
34 Contact portion
35 Spring element
36 End portion
37 Line
38 Cover bottom
39 Stamped/bent part
40 Receptacle
42 Protective wall
43 Protective wall
44 Protective wall
46 Inner face
47 Inner face
48 End side
51 Slot
52 Slot
54 Blocking element
56 Introduction direction
58 Protrusion
59 Portion
60 Portion
62 Gap
A Distance
$A_1$ Distance
$A_2$ Distance
$A_3$ Distance
X Position
Y Position
Z Position
F Contact force

What is claimed is:

1. Wiper motor having a housing element connected to an electrical line that has an elastically deformable spring element in an end region projecting out of the housing element, wherein the spring element, in order to form an electrically conductive connection with a counterpart element on the housing element, is movable, with respect to a first, relaxed position of the spring element, into a second, elastically deformed position generating a contact force on the counterpart element, characterized in that a blocking element is provided on the housing element, which holds the spring element in a third, elastically deformed position in which the deformation of the spring element is less than in the second position of the spring element.

2. Wiper motor according to claim 1, characterized in that a contact portion of the spring element in the first position is at a distance from a cover bottom that is greater than a distance of the contact portion of the spring element in the third position, and in that a distance of the contact portion of the spring element in the second position from the cover bottom is less than the distance in the third position of the contact portion of the spring element.

3. Wiper motor according to claim 1, characterized in that the spring element in the second position and in the third position is arranged regionally in a receptacle of the housing element.

4. Wiper motor according to claim 3, characterized in that the receptacle has protective walls, which are arranged at a small distance from the spring element, and in that the protective walls are connected integrally to the element.

5. Wiper motor according to claim 4, characterized in that the spring element projects regionally beyond an end side of the protective walls in the three positions.

6. Wiper motor according to claim 1, characterized in that the housing element consists of plastic and is in the form of an injection-moulded part, and in that the electrical line is encapsulated regionally with the material of the housing element.

7. Wiper motor according to claim 1, characterized in that the blocking element is connected to the housing element by means of a force- and/or form-fitting connection.

8. Wiper motor according to claim 7, characterized in that the blocking element consists of a harder material than the housing element, in particular of steel, and in that the blocking element has barb-like protrusions that plastically deform the material of the housing element in the installed position of the blocking element in the housing element.

9. Wiper motor according to claim 8, characterized in that the blocking element is formed in a plate-like manner and is guided in a linearly movable manner in groove-like slots in the housing element.

10. Wiper motor according to claim 9, characterized in that the blocking element has at least one portion for limiting the movement of the blocking element in the slots of the housing element in an introduction direction.

11. Wiper motor according to claim 1, characterized in that the housing element is a gearbox cover, which closes a gearbox housing of the wiper motor, and in that the counterpart element cooperating with the spring element is arranged in the region of a gearwheel.

12. Wiper motor according to claim 1, characterized in that a gap is formed between the spring element and the blocking element in the second position of the spring element.

13. Method for producing a wiper motor configured according to claim 1, comprising at least the following steps:
producing the housing element with the electrical line fastened thereto,
fastening the blocking element to the housing element, wherein the spring element is moved from the first position into the third position,
assembling the housing element on the wiper motor, wherein a counterpart element cooperating with a contact portion of the spring element moves the spring element from the third position into the second position.

* * * * *